United States Patent [19]

Ribic, Jr.

[11] Patent Number: 5,567,239
[45] Date of Patent: Oct. 22, 1996

[54] MASKING PROFILE FOR USE IN PAINTING CAR BODIES

[76] Inventor: Harald Ribic, Jr., Planetenfeldstrasse 103a, 4600 Dortmund 70, Germany

[21] Appl. No.: 545,885

[22] Filed: Oct. 20, 1995

Related U.S. Application Data

[63] Continuation of Ser. No. 142,290, filed as PCT/EP92/01021, May 9, 1992, abandoned.

[30] Foreign Application Priority Data

May 18, 1991 [DE] Germany .............................. 9106206 U

[51] Int. Cl.⁶ .................................................. B05C 21/00
[52] U.S. Cl. .......................................... 118/504; 118/505
[58] Field of Search ........................ 118/504, 505; 427/272, 282; 428/119, 194, 40, 177

[56] References Cited

U.S. PATENT DOCUMENTS

| | | | |
|---|---|---|---|
| 2,889,804 | 6/1959 | Dim et al. | 118/504 |
| 2,922,392 | 1/1960 | Mund | 118/505 |
| 2,954,752 | 10/1960 | Hayward | 118/505 |
| 2,959,152 | 11/1960 | Byers et al. | 118/505 |
| 3,693,589 | 9/1972 | Knox | 118/504 |
| 3,962,989 | 6/1976 | Groff, Sr. | 118/504 |
| 4,263,355 | 4/1981 | Sarkisian | 428/124 |
| 4,313,970 | 2/1982 | Jones et al. | 427/282 |
| 4,398,495 | 8/1983 | Harris, Jr. et al. | 118/504 |
| 4,791,007 | 12/1988 | Gleason et al. | 118/504 |
| 4,877,673 | 10/1989 | Eckel et al. | 428/194 |
| 4,915,058 | 4/1990 | Murray | 118/505 |

FOREIGN PATENT DOCUMENTS

| | | |
|---|---|---|
| 2746502 | 6/1978 | Germany . |
| 8513902 | 10/1986 | Germany . |

*Primary Examiner*—Laura Edwards
*Attorney, Agent, or Firm*—Cohen, Pontani, Lieberman, Pavane

[57] ABSTRACT

A masking profile for use in painting the transitional area between motor vehicle windshields embedded in profile members or gaskets and the motor vehicle body. The masking profile is constructed with two profile legs at an angle relative to one another and with an adhesive coating on at least one profile leg. A shorter L-leg is for engaging behind the lip of the profile member or gasket holding the vehicle windshield, which lip contacts the body region to be painted. Additionally, a longer L-leg is for gluing onto the outer surface of the windshield and/or on body surfaces.

7 Claims, 3 Drawing Sheets

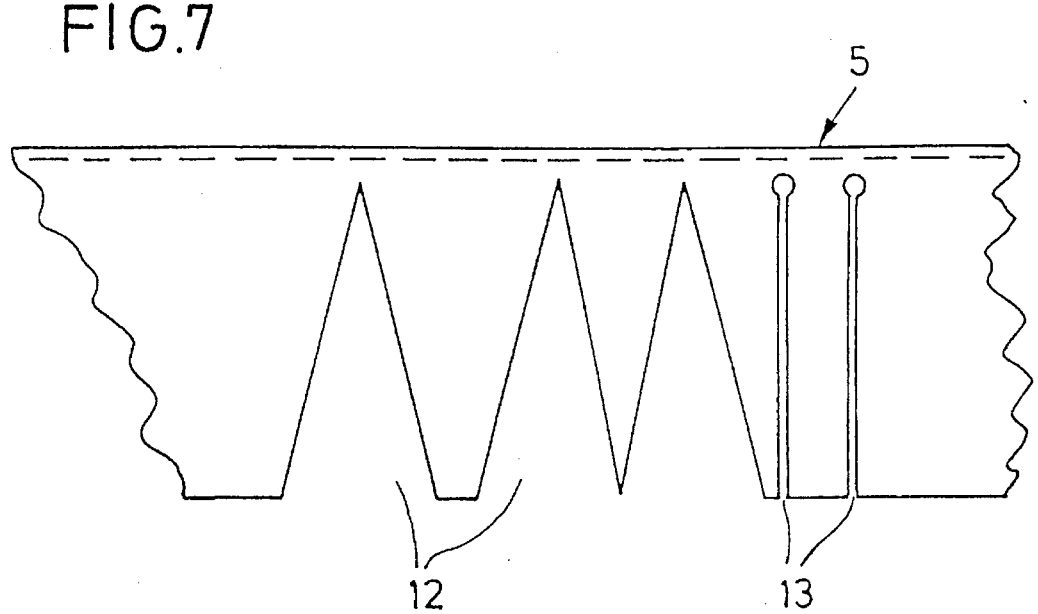
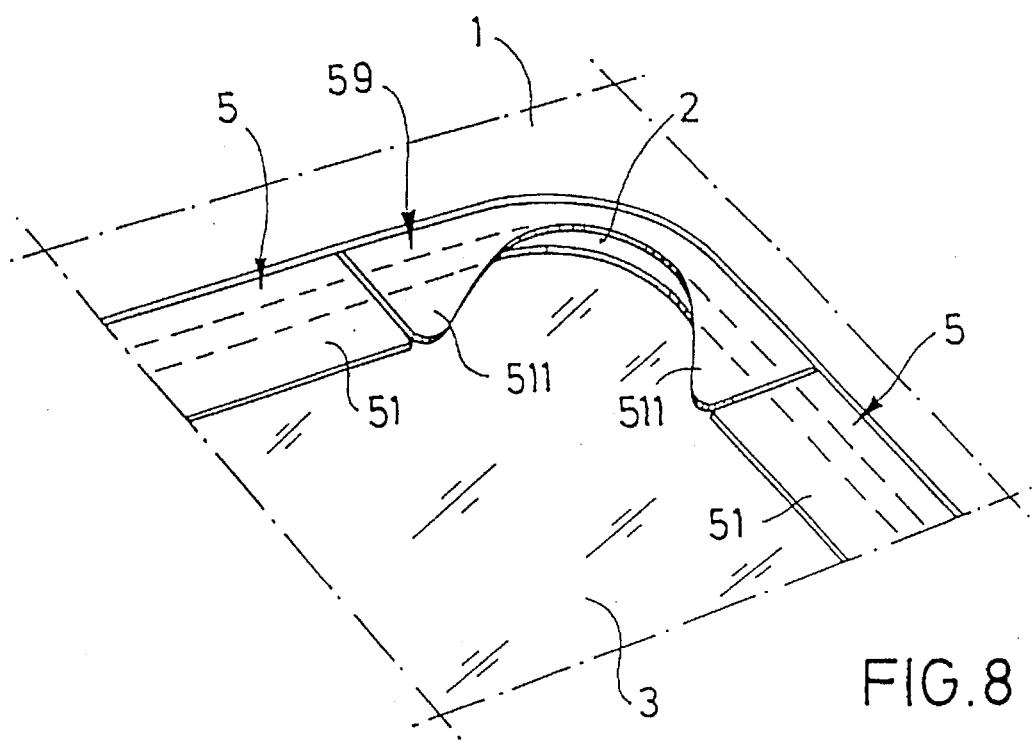

MASKING PROFILE FOR USE IN PAINTING CAR BODIES

This is a continuation of application Ser. No. 08/142,290, filed filed as PCT/EP92/01021, May 9, 1992 now abandoned.

BACKGROUND OF THE INVENTION

1. Field of the Invention

The invention is directed to a masking profile for use in enamelling or painting work in the transitional area between motor vehicle windshields embedded in profiles and the motor vehicle body.

2. Description of the Prior Art

When painting car bodies, areas which are not to be painted, particularly sealing profiles, the transitional profiles between the body and inserted panes of glass and the like, must be masked off to protect them from the paint. Painting templates or stencils are known, e.g. from U.S. Pat. No. 2,954,752 or DE-85 13 902-U, to protect tires, for example when painting the rims. A removable mask which protects a pane of glass is shown in U.S. Pat. No. 4,915,058 as a large-area element. A mask for lettering which is not to be painted is known from U.S. Pat. No. 2,959,152. U.S. 2,922,392 shows a flat protective template for panes of glass embedded in rubber profiles which is provided with a circumferential edge.

In modern vehicles, the front and rear windshields are normally glued directly to the body in comparatively inherently rigid profiles. Before carrying out the painting work, the transitional regions between the body and windshield sealing frames must be masked, which is costly with conventional masking profiles, e.g. according to DE-27 46 502-A, and is sometimes not possible, since regions of the windshield profile must be grasped from behind and lifted from the surfaces of the body for painting.

SUMMARY OF THE INVENTION

The object of the present invention is therefore to provide a solution by which the windshield profiles of motor vehicle windshields can be masked in a simple manner for painting work.

This object is met according to the invention with a masking profile of the type mentioned above in that the profile is constructed so as to be L-shaped in cross section with two profile legs at an angle to one another in the use position and with an adhesive coating on at least one profile surface.

A shorter L-leg engages behind the lip of the profile framing the vehicle windshield, which lip contacts the body region to be painted and a longer L-leg is for gluing on the outer surface of the windshield and/or body surfaces.

With the masking profile according to the invention it is possible to engage behind the sealing lips at the windshield profiles and to lift them from the body surface to be painted and fix them in the lifted position. The occurring forces can be applied by means of the gluing via a longer leg.

For general enamelling or painting work, partially angled or bendable profiles are known, e.g. from U.S. Pat. No. 4,398,495 or U.S. Pat. No. 4,263,355. But these profiles are not suitable for the area of use of the present invention. The small folding or bending edge in the profile according to U.S. Pat. No. 4,263,335 is not capable of absorbing the returning or restoring forces occurring in motor vehicle windshield profiles. For this purpose, a comparatively rigid angular construction according to the invention is necessary in every case.

It is provided in a development according to the present invention that regions of the profile leg serving for gluing are removed, which has the advantage that the profile can also be used for gluing around corners in spite of its desired inherent rigidity.

To facilitate handling, it is provided according to the invention that at least the profile leg used for engaging behind the profile sealing lips is tapered at its end. Further, the legs can also be tapered toward the free end proceeding from the angle corner.

For optimal absorption of the occurring forces, the invention provides that the leg which is coated with adhesive is constructed so as to be at least 1.2 times wider than the shorter leg, particularly more than 3 times wider.

Instead of a basic removal of parts of the adhesive surface, it can also be provided alternatively or additionally that at least parts of the leg surfaces are slotted and/or provided with notches.

To further simplify handling, it can also be provided according to the invention that it is formed from individual short elements which are inherently rigid at least in some areas to enable lateral insertion under regions of the windshield profiles.

In practice, such elements can have a length of 20 cm, for example. They can be slid under the windshield profiles laterally one after the other from the corner areas and then form a tight circumferential masking profile in the final masking area. The short elements can be sold to the consumer in bundles so that handling is at least as easy as if the profile were wound up on a roll or as a strip as is known from the prior art.

The invention is explained in more detail in the following by way of example with reference to the drawing.

BRIEF DESCRIPTION OF THE DRAWINGS

FIG. 7 shows a top view of one of the profile legs of the masking profile with differently shaped recesses; and FIG. 8 shows a simplified three-dimensional top view of a corner area of a masked windshield profile.

DETAILED DESCRIPTION OF THE PREFERRED EMBODIMENTS

Figure 1:
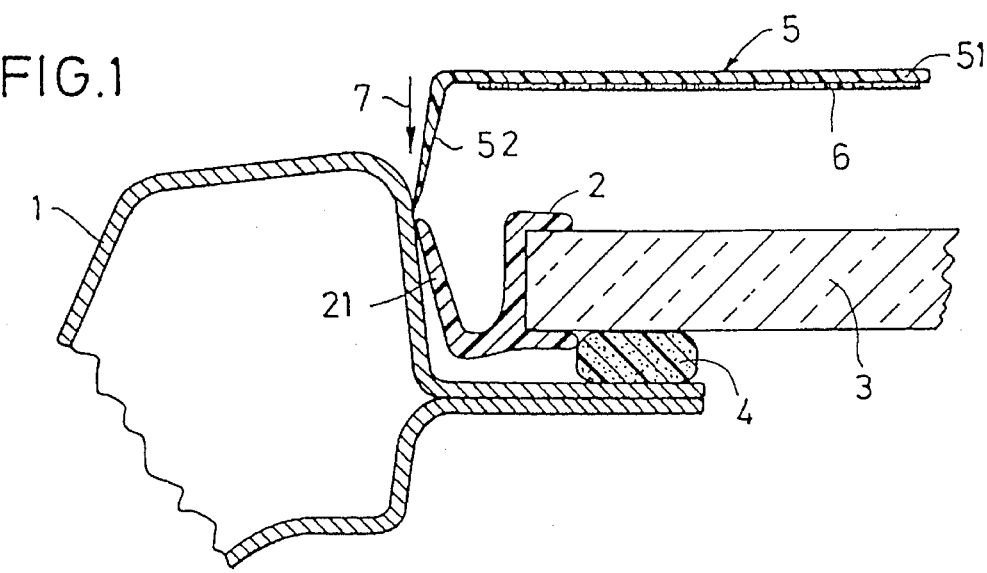
FIG. 1 shows a cross section through the transitional region between a glued in windshield and the body, the masking profile has not yet been inserted.

In order to paint a body region, designated by 1, which is provided with a sealing frame 2 for a windshield 3 glued with an adhesive profile 4, a masking profile according to the invention, designated in general by 5, is inserted in the direction of arrow 7 (FIG. 1) behind the lip 21 of the sealing frame 2. In this instance, the masking profile 5 is constructed so as to be L-shaped in cross section with a profile leg 51 which is provided with an adhesive coating 6 on its inner side and a profile leg 52 whose front region 9 (FIG. 4) is tapered to form a tip.

Figure 2:
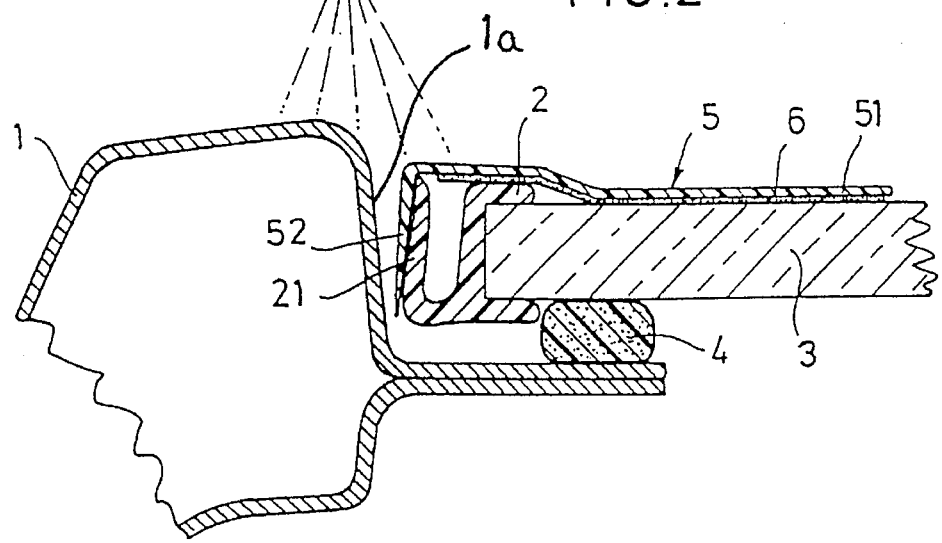
FIG. 2 shows the same cross section with the masking profile in the use position.

The profile is slid in behind the lip 21 by this front region 9 and is glued to the windshield profile 3 so as to be slightly offset laterally in such a way that the lip 21 is lifted away from the panel slightly as is shown in FIG. 2. The paint can now be sprayed on by the spray head 8 which is graphically suggested in FIG. 2. Due to the masking profile 5, it is possible that paint mist reaches the body region, designated by 1a, which is covered in the use position by the lip 21 of the profile 2.

When the profile 5 is removed after the painting work has been completed, the lip 21 lies over the edge of paint which has formed so that the resulting painting is always clean and free of burrs.

Figure 3:
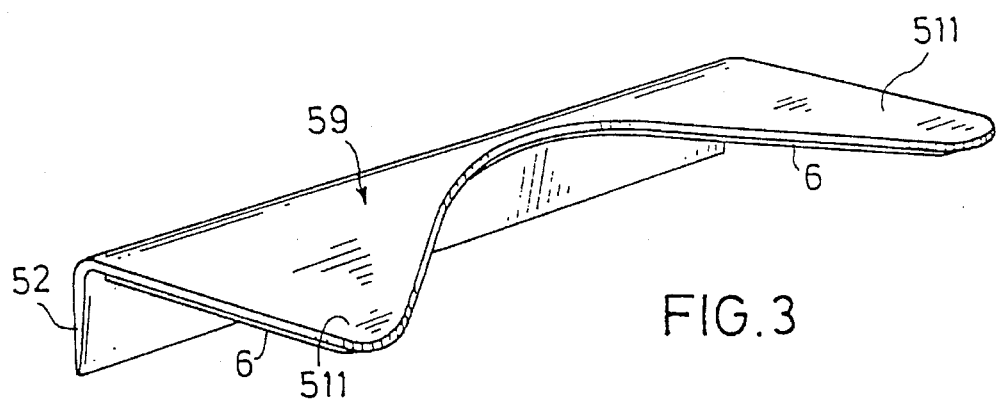
FIG. 3 shows a three-dimensional view of a masking profile to be used particularly for corners.

In order to lift particularly the corners of the sealing frame at the windshields from the body areas, an especially advisable design for the invention consists in a short profile 59 as shown in FIG. 3. This short profile 59 is constructed so as to be comparatively inherently rigid and has a profile leg 52, as described above, for engaging behind the sealing lip 21 at the profile frame 2 and two profile tabs 511 which are formed by a larger inner cut out portion as shown in FIG. 3 as well as in FIG. 8. Accordingly, it is possible to guide the masking profile 59 around the corner of a sealing frame 2.

The masking profiles 5 are advisably constructed as short pieces in such a way that they can be inserted laterally behind the sealing lip 21 of the sealing frame 2, which greatly simplifies the fitting of the masking profile 5. These short pieces are not shown in detail in the drawings with the exception of FIG. 3.

Figure 4:
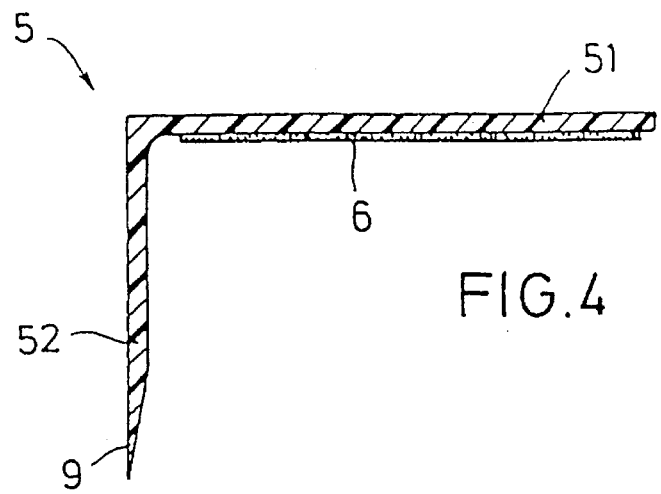
FIGS. 4 to 6 show different cross-sectional shapes of the masking profile.
Figure 5:
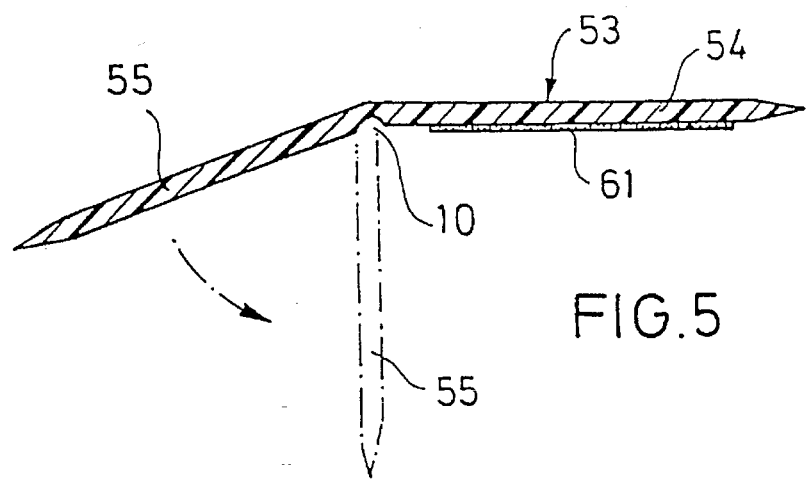

In contrast to the L-profile shown in FIG. 4, which is already in its final form when leaving the factory, FIG. 5 shows a profile 53 as a flat profile which, in the example shown in the drawing, is already pre-bent slightly before leaving the factory. This flat profile 53 with its two legs 54 and 55 has a stamped bend 10 in the region of what will later be the angle corner which makes it possible to swivel the leg 55 relative to the leg 54 into the position shown in dashes, which is indicated in FIG. 5 by an arrow.

Figure 6:
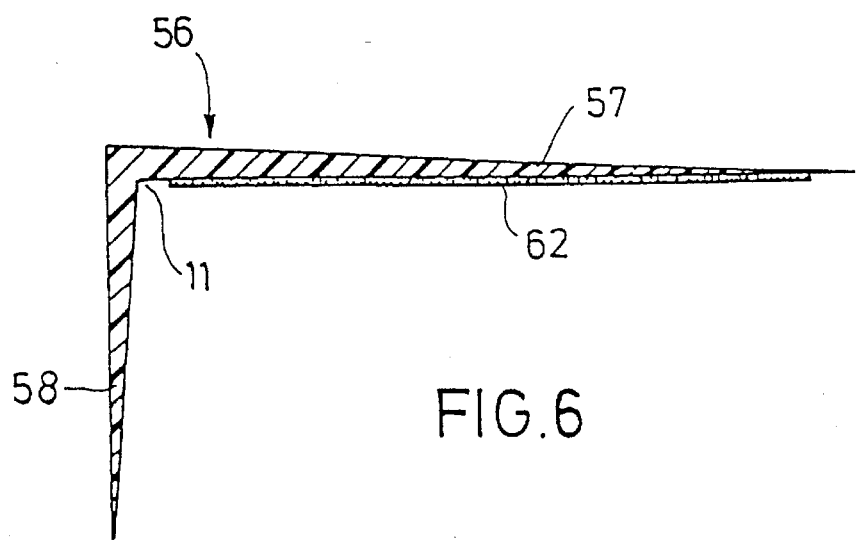

The profile can also be designed in the manner shown in FIG. 6, also to facilitate handling, as the case may be. In FIG. 6, the leg 57 of the profile 56 provided with the adhesive coating 62 is roughly twice as long as the leg 58 without the adhesive coating.

FIG. 6 also shows that the legs 57 and 58 can be constructed so as to taper uniformly proceeding from the angle corner. This is particularly advantageous for economizing on material and to facilitate the winding of this material on rolls, as the case may be, in that, in addition to the strip corner 11, the remaining areas of the profile, particularly those coated with adhesive, are constructed so as to be comparatively flexible.

Another way to cover slight bends and curves with the profile 5 other than that described above consists in introducing notches 12 or slots 13 in at least one leg as shown in FIG. 7. These notches 12 and slots 13 can already be provided at the factory. However, according to the invention, another possibility consists in providing the user with a tool uniquely adapted to this purpose so that the user can insert the slots or notches directly during the masking process at the locations where they are needed.

Naturally, the described embodiment examples of the invention can be modified in many other ways without departing from the basic idea. For example, the leg which is not provided with an adhesive coating can also be designed so as to face the other leg 51 at an acute angle with respect to the inner angle corner 11. In extreme cases, the legs 51 and 52 could lie flat against one another in the transporting and packing position when packaged. The user then bends them roughly into the L-shape. In this case, the angle corner can be designed in the factory in such a way, e.g. by corresponding material accumulation, that a determined desired angle, in extreme cases a right angle, may not be exceeded.

I claim:

1. A masking profile for use in painting a transitional area between a motor vehicle windshield embedded in a profile member and a motor vehicle body, the masking profile comprising: two profile legs which form a rigid element with an L-shaped cross section and define an angle relative to one another, in a use position; and an adhesive coating provided on at least one of the profile legs, the profile legs including a shorter leg that is engageable behind a lip of the profile member holding the vehicle windshield, which lip contacts a region of the vehicle body to be painted, the profile legs further including a longer leg on which the adhesive coating is provided so that the longer leg is adhereable to at least one of an outer surface of the windshield and a body surface of the vehicle, the longer leg having regions that are removed to define bendable sections of the longer leg that can bend in a plane defined by the longer leg.

2. A masking profile according to claim 1, wherein the shorter leg has a tapered end.

3. A masking profile according to claim 1, wherein the longer leg has a tapered end.

4. A masking profile according to claim 1, wherein the legs are each formed so as to taper from the angle to a free end.

5. A masking profile according to claim 1, wherein both of the legs have a width, the width of the longer leg being at least 1.2 times the width of the shorter leg.

6. A masking profile according to claim 5, wherein the longer leg is more than three times wider than the shorter leg.

7. A masking profile according to claim 1, wherein at least one of slots and notches are provided in parts of the legs.

\* \* \* \* \*